United States Patent

Han

[11] Patent Number: 5,116,292
[45] Date of Patent: May 26, 1992

[54] VARIABLE DRIVE TRANSMISSION

[76] Inventor: Kyung S. Han, 1922 Coe's Post Run, Westlake, Ohio 44415

[21] Appl. No.: 739,229

[22] Filed: Aug. 1, 1991

[51] Int. Cl.⁵ .............................................. F16H 37/12
[52] U.S. Cl. ................................................... 475/16
[58] Field of Search ............................ 475/14, 15, 16

[56] References Cited

U.S. PATENT DOCUMENTS

| | | | |
|---|---|---|---|
| 2,547,453 | 4/1951 | Egy | 475/16 |
| 2,958,239 | 11/1960 | Bernier | 475/327 |
| 3,114,273 | 12/1963 | Boggs | 475/16 |
| 3,398,596 | 8/1968 | Jahnke | 74/413 |
| 3,426,609 | 2/1969 | Princz et al. | 475/14 |
| 4,261,225 | 4/1981 | Zahradnik | 74/665 GA |
| 4,277,986 | 7/1981 | Worddington | 475/16 |
| 4,909,101 | 3/1990 | Terry, Sr. | 475/16 |
| 4,961,719 | 10/1990 | Wildermuth | 474/50 |
| 5,016,493 | 5/1991 | Han | 74/840 |

Primary Examiner—Dirk Wright
Attorney, Agent, or Firm—Harpman & Harpman

[57] ABSTRACT

A mechanical transmission device for selective gear speed and directional output from a constant input source. A plurality of planetary gears engageable on a central input gear can be selectively driven on their own axis or orbitally around the central input gear varying output dependent on the speed of orbital rotation.

3 Claims, 4 Drawing Sheets

VARIABLE DRIVE TRANSMISSION

BACKGROUND OF THE INVENTION

1. Technical Field

This device is associated with gear transmissions that can vary relative output from a given power source to provide useful control and output by different gear ratios in accordance with varied applications.

2. Description of Prior Art

Prior art devices of this type have relied on a variety of different gearing configurations to increase or decrease relative output ratio from a fixed or variable speed input. See for example U.S. Pat. Nos. 2,958,239, 3,398,596, 4,961,719, 4,261,225 and applicant's own U.S. Pat. No. 5,016,493.

In U.S. Pat. No. 2,958,239 a gear device transmission is disclosed having a belt driven pulley driving a planet gear carrier of a cylindrical drum configuration. A locking device can engage and hold the drum stationery when not interconnected with the pulley.

In U.S. Pat. No. 3,398,596 a gear power transmit device is disclosed that utilizes a pair of gears controlled with and driven by an internal gear. The pair in gears is in turn driven by secondary gears engaging a pinion gear and connected to an output shaft and pulley.

U.S. Pat. No. 4,961,719 discloses a variable drive transmission using a carrier member mounted on a rotatable crank shaft with a number of spaced pivotally mounted segments that can selectively engage a central sprocket with multiple chain engaging sprockets rotatable secured to each segment.

In applicant's own U.S. Pat. No. 5,016,493 discloses a variable speed gearing assembly that relies on the relative orbital size of a variation gear on a rotating crank shaft. A cyclable output is provided with an initial half-cycle due to the interlinking arm configurations.

SUMMARY OF THE INVENTION

A variable speed and reversible direction transmission to selectively provide variable speed output by use of a simple self-contained gear assembly that effectively changes the relative orbital path of multiple pairs of interconnected cam centered gears to vary output speed.

DESCRIPTION OF THE PREFERRED EMBODIMENT

Referring to FIGS. 1-6 of the drawings a principal element 10 and two modified forms 11 and 12 of the basic elements that are inclusive of the final form of the invention are illustrated. The underlying principal of the invention is to modify the "orbital path" and is shown in its final application form in FIGS. 9-11 of the drawings.

Figure 1:
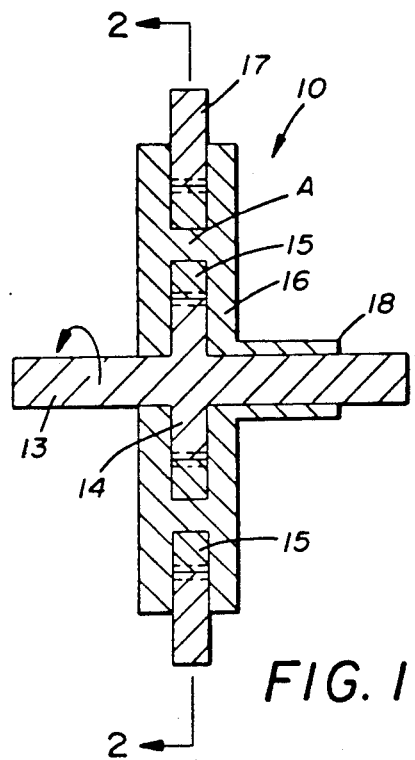
FIG. 1 is a cross-sectional view of a principal element of the gear drive device.
Figure 2:
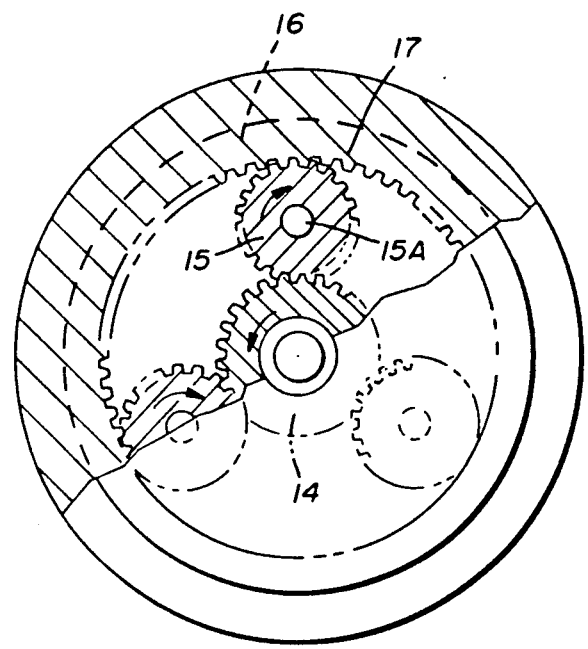
FIG. 2 is a partial cross-section on lines 2—2 of FIG. 1.

In FIGS. 1 and 2 of the drawings the principal element 10 can be seen having an input shaft 13, a fixed drive gear 14 and a plurality of spaced planetary gears 15 engageable therewith. Each of the planetary gears 15 is pivotally secured to an output element 16 rotatably positioned on said input shaft 13. A control ring gear 17 engages each of said planetary gears 15 as best seen in FIG. 2 of the drawings. The basic principle of operation is as follows. Given a constant rotation of the input shaft 13 and a freely rotatably (unlocked) ring gear 17, the planetary gears 15 driven by the drive gear 14 will rotate on their respective axis imparting no motion to the output element 16.

By locking said ring gear 17 the planetary gears 15 are forced to orbit around the drive gear 14, thus driving said output element 16 and imparting output for the assembly at 18. It will be evident to those skilled in the art that by varying (i.e. restricting the rotation) of the ring gear 17 a variable output can be achieved at 18 dependent at a given ratio from the input on the drive shaft 13.

Figure 3:
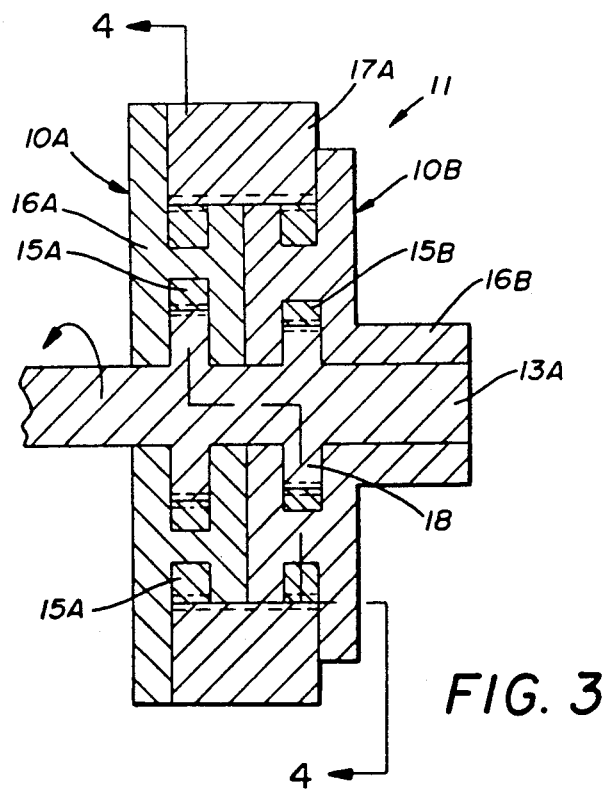
FIG. 3 is a cross-sectional view of a modified form of the principal element of the invention.
Figure 4:
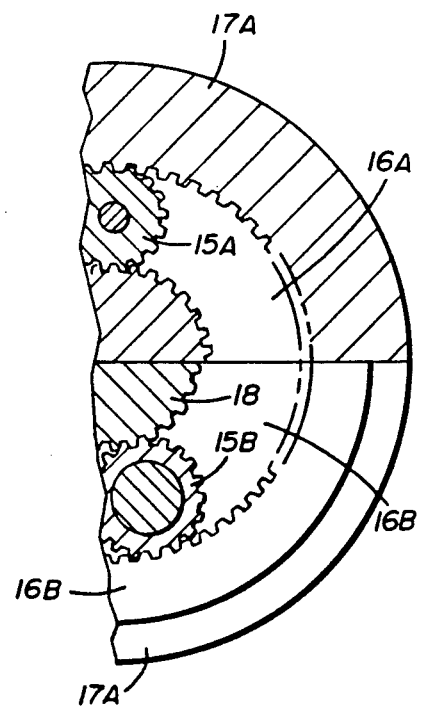
FIG. 4 is a partial cross-section on lines 4—4 of FIG. 3.

Referring now to FIGS. 3-4 of the drawings, the modified form 11 of the basic element 10 can be seen. The modified form 11 has all of the structural features illustrated in element 10 with modified output elements 16A and 16B and a ring gear 17A. The modified form 11 is comprised of two modified elements 10 designated in this example as 10A and 10B with an extended input shaft 13A. The output elements 16A and B are interconnected via the ring gear 17A which allows for reversal of final output. In operation, the output element 16A is locked, planetary gears 15A in element 10A drive the ring gear 17A which in turn drives planetary gears 15B in element 10B. The planetary gears 15B in element 10B counter rotate against a drive gear 18 on the extended input shaft 13A driving an output element 16B.

By unlocking output element 16A and locking ring gear 17A reverse output rotation is achieved by the drive gear 18 driving the planetary gears 15B in element 10B which in turn rotates output element 16B in the reverse direction.

Figure 5:
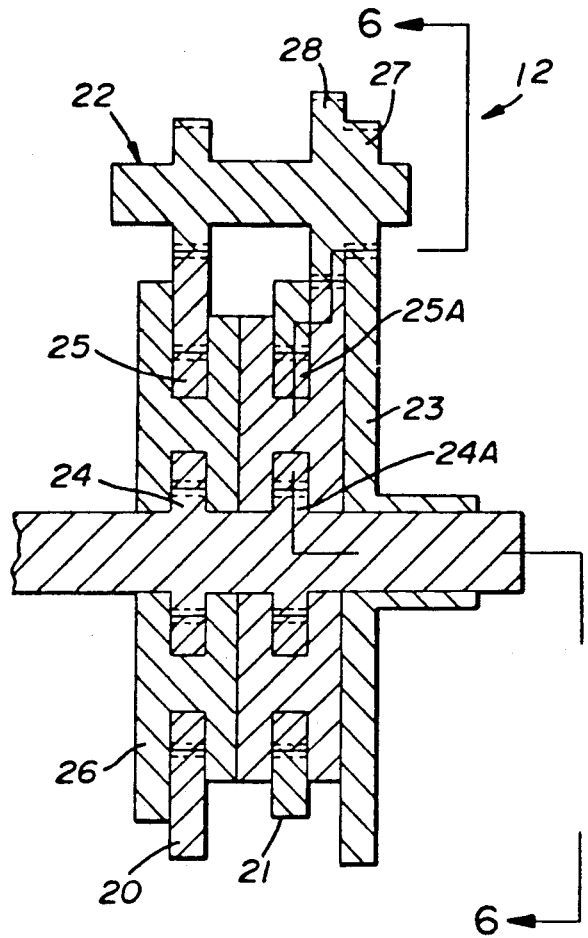
FIG. 5 is a cross-sectional view of a secondary modified form of the principal element of the invention.
Figure 6:
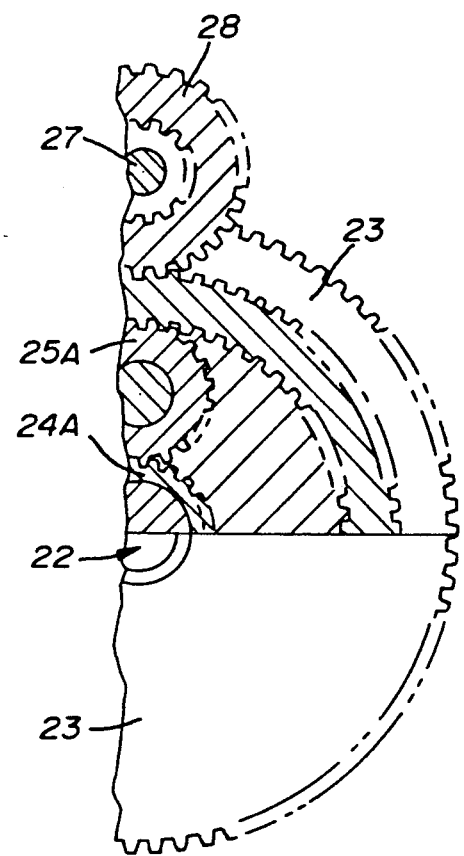
FIG. 6 is a partial cross-section on lines 6—6 of FIG. 5.

Referring now to FIGS. 5 and 6 of the drawings, a third modified form 19 of the element 10 can be seen. The modified form 19 contains all of the structural features illustrated in both element 10 and modified form 11 combined with independent ring gears 20 and 21 an interconnecting shaft and gear assembly 22 and a modified ouatut gear 23.

The principals of operation remain the same as the first two forms while the control sequence changes.

In operation, a main input drive shaft and its first drive gear 24 drives planetary gears 25. When an output gear element 26 is locked, the planetary gears 25 drive the ring gear 20 which in turn drive said shaft and gear assembly 22 imparting motion to the modified output element 23 via gear 27. Since the ring gear 21 is unlocked, the ancillary input of the gear 28 on the gear and shaft assembly 22 will not effect the relative output. To reverse the effective direction of the output gear 23, the output gear element 26 is unlocked and the gear ring 21 is locked. In this configuration a secondary drive gear 24A drives secondary planetary gears 25A which orbit within the locked ring gear 21 driving said output element 23 via said gear assembly 22 as hereinbefore described.

Referring now to FIGS. 7-11 of the drawings, the final applied form of the invention can be seen which includes all of the hereinbefore described elements and modified forms thereof 10, 11, and 12 respectively in a modified configuration with the inclusion of an adjustable camming and drive take-off assembly (ACD).

Figure 9:
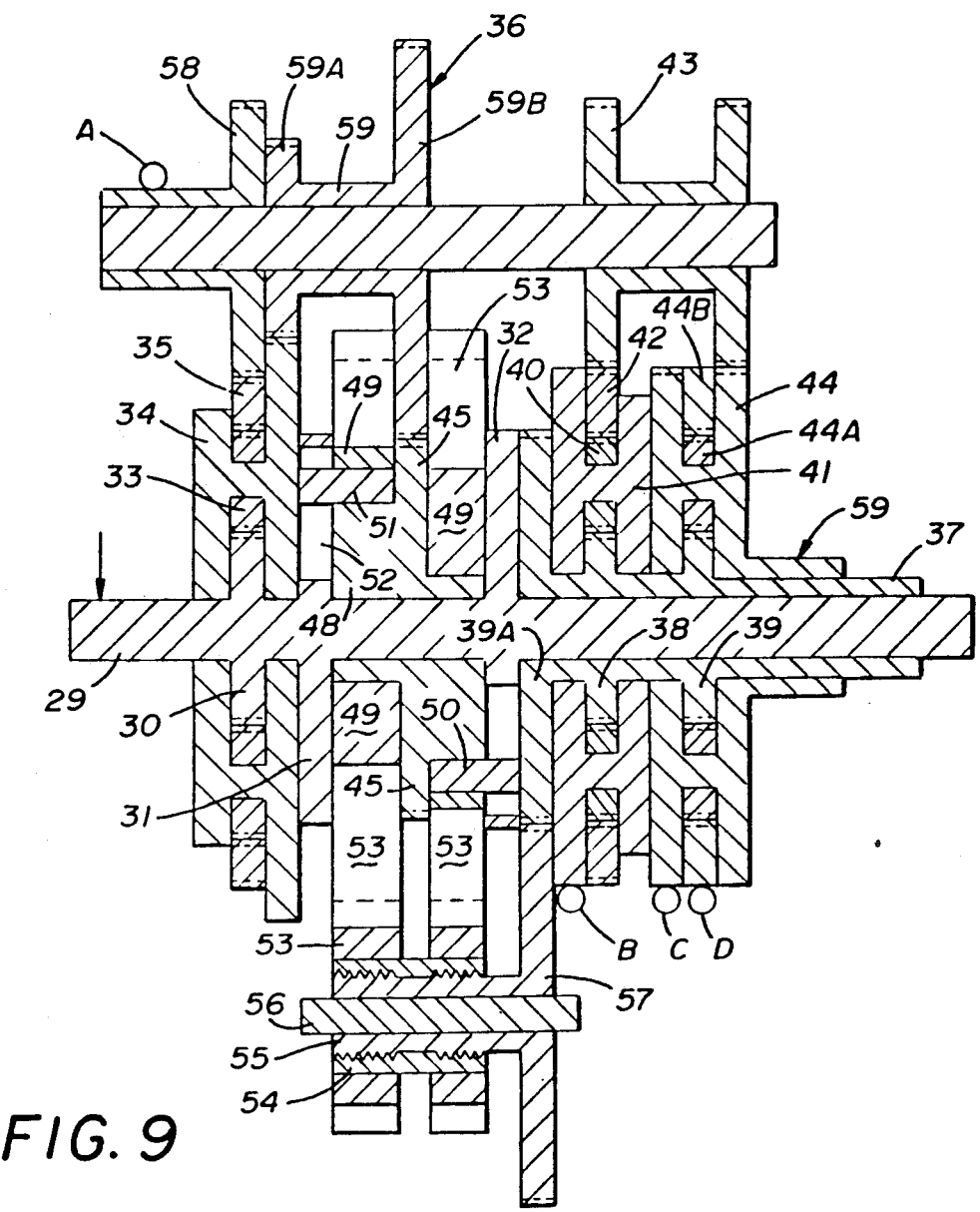
FIG. 9 is a cross-sectional view of the completed variable speed and reversible direction transmission.

In FIG. 9 of the drawings, a main input shaft 29 can be seen having a drive gear 30, a pair of spaced slotted control disks 31 and 32. The drive gear 30 engages a plurality of spaced planetary gears 33 within an output element 34. A ring gear 35 interconnects said planetary gears 33 with a control, transfer shaft and gear assembly generally referred to as 36. Control points in this example are illustrated by circles A-D.

An effective secondary main input shaft 37 rotatably positioned on said main input shaft 29 has secondary space drive gears 38 and 39 and secondary input drive gears 39A extending therefrom. A plurality of spaced planetary gears 40 within an output element 41 are engageable within a ring gear 42. A multiple transfer gear 43 is rotatably positioned from said shaft and gear assembly 36 to engage said ring gear 42 and a secondary output element 44. Planetary gears 44A are positioned with said secondary output element 44 and are engageable with their own respective ring gear 44B.

Figure 10:
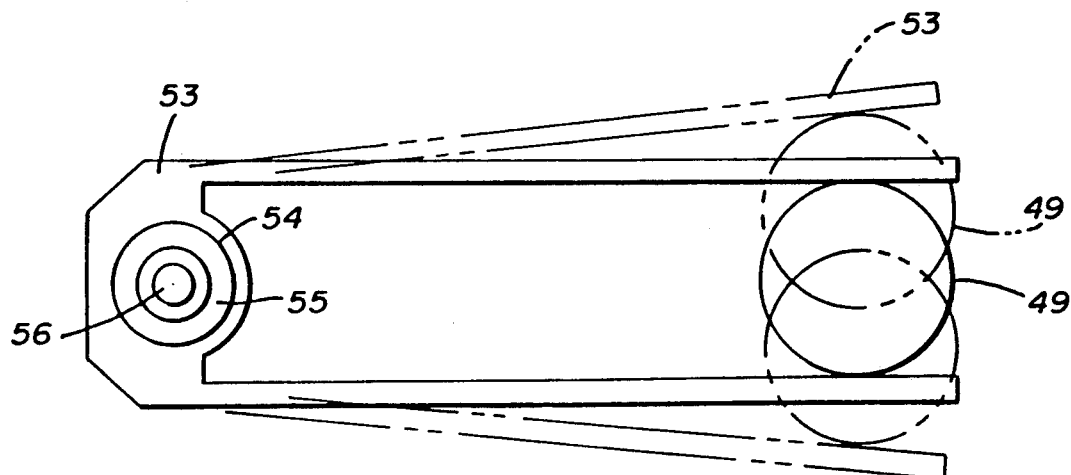
FIG. 10 is a side plan illustrated view illustrating the power output from the variable cam assembly.
Figure 11:
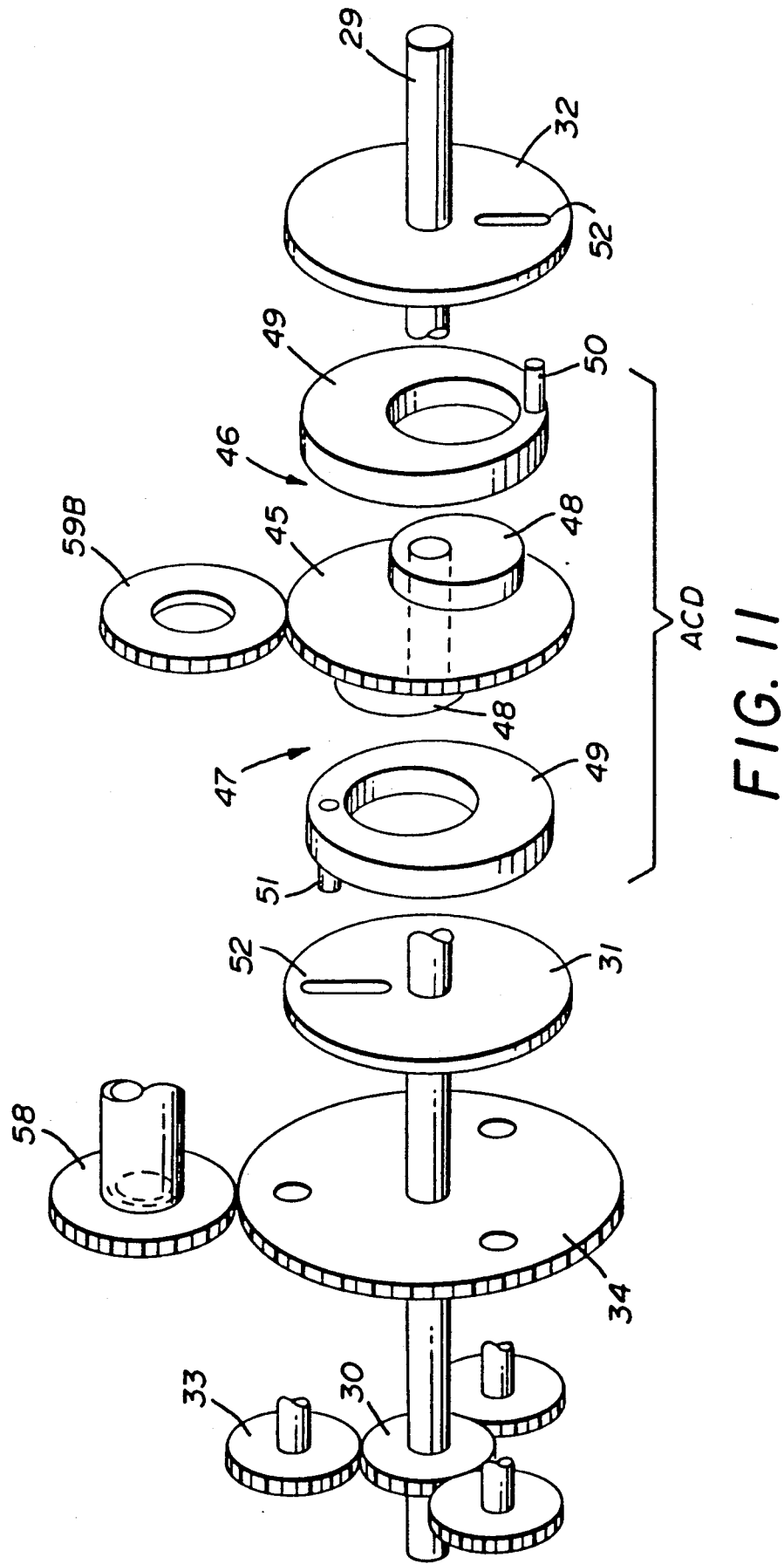
FIG. 11 is an exploded perspective view of the center input drive shaft and associated variable cam assembly.

The output element 34 is interconnected to said secondary output elements 44 via said adjustable camming and drive assembly (ACD) best seen in FIGS. 9-11 of the drawings.

The (ACD) is comprised of a main cam disk 45 having an offset oppositely disposed dual part cams 46 and 47 thereon. The cam disk 45 has a central bore therethrough and is rotatably positioned on said main input shaft 29. The dual part cams 46 and 47 are each comprised of an offset circular disk 48 and circular cam 49 having an offset opening therein registrable with said disk 48. Control pins 52 and 51 extend from each of said cams 49 respectively inwardly of their perimeter edge adjacent said offset opening therein. The pins 50 and 51 are registrable within respective slots at 52 in said slotted disks 31 and 32 hereinbefore described.

Referring to FIGS. 9 and 10 of the drawings, a pair of bifurcated cam engagement arms 53 can be seen slideably engaging the respective cams 49. The arms 53 are journaled at 54 with a one-way clutch bearing 55 within as will be well known and understood by those skilled in the art. A drive sleeve 56 extends from said one-way clutch bearing 55 having a clutch drive gear 57 extending therefrom for engagement with said secondary input drive gear 39A as hereinbefore described.

The control transfer shaft and gear assembly 36 comprises three sets of control transfer gears 58, 59 and hereinbefore described multiple transfer gear 43. The transfer gear 58 is of a control gear input nature wherein the relative position of the cams 49 to the cam disk 45 can be changed. The transfer gear 59 has multiple gear elements 59A and 59B spaced in relation to one another. The gear element 59A is engageable with said output element 34 transferring output via gear element 59A to the control disk 45.

In operation, original input of rotational motion from a power source (not shown) drives the main input shaft 29 and is transferred to the cam disk 45 in a one to one ratio between the slotted disks 31 and 32 with registrable pins 50 and 51 therein and the cam disk 45 as described above. This one to one ratio maintains the cam 49's relative position to the cam disk 45. It will be evident from the above description that to change the cam 49's relative position (i.e. orbital path about the axis of the main input shaft 29) a momentary restriction of the transfer gear 58 is required. By doing so, the transfer gear 59 slows momentarily along with the cam disk 45. The cam 49 driven by the pins 51 continue thus repositioning themselves about the offset disk 48 effectively changing their true orbital path about the central axis of the main input shaft 29.

Figure 7:
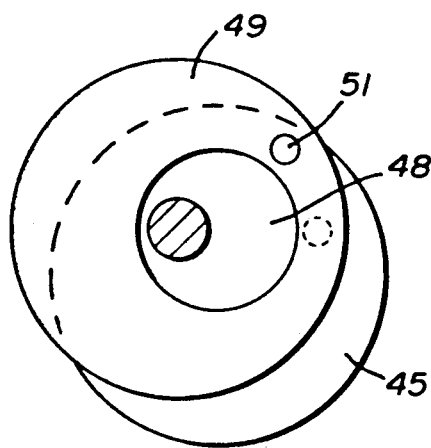
FIG. 7 is a graphic illustration of the variable orbital path determined by interconnected cam elements.
Figure 8:
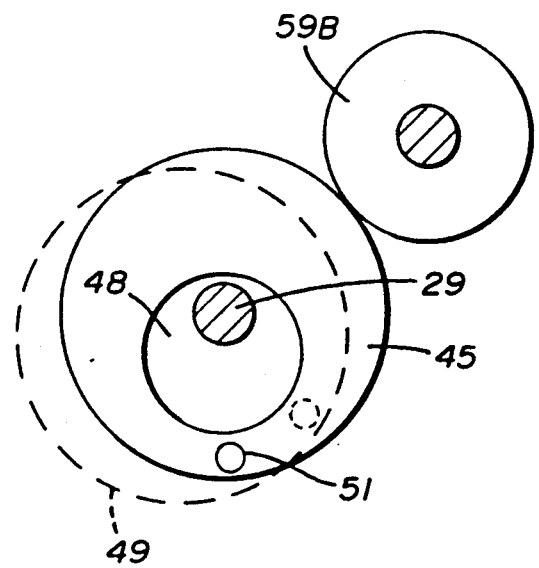
FIG. 8 is a graphic illustration of the orbital path defined by the cam element's rotation.

By referring to FIGS. 7 and 8 of the drawings, the relative repositioning of the cams 49 and the cam disk 45 is graphically illustrated. In FIG. 8 of the drawings in solid lines, the cam 49, cam disk 45 and pin 51's relative positons are shown. By repositioning the cam 49 (shown in broken lines) the orbital path of the cam 49 has thus been changed. In FIG. 7 of the drawings the cam disk 45 has advanced a quarter turn with the cam 49 following in an oscillating path. If the cam 49 was not repositioned it would rotate about the central axis of the cam disk 45 with no relative oscillation of its orbital path in relation to the central axis.

With the orbital path thus increased, the relative oscillation is transferred to the arms 53 which either increases or decreases dependent on the relative position of the cam 49 to the cam disk (i.e. their orbital path) 45. Since the cams 49 are always offset axially from one another the rotational output of the arms (which is cyclable from each cam) is constant to the secondary input drive gear 39A.

In operation, the effective directional output of the secondary input shaft 37 can be changed by locking the respective gear associated with the control points B and D. Therefore, by locking control point D (ring gear 44) output is available at 59. By locking control point B the output at 59 is reversed. By locking control point C there is no output at 59 in any direction.

In this example, variable speed (output) is possible in repositioning the cams orbital path by momentary locking of the control point A as hereinbefore described. An additional advantage of such a system is that a variable speed constant power take-off is available via secondary main input shaft 37 if so desired.

Thus it will be seen that a variable drive transmission has been illustrated and described herein with the primary element 10 and two modified forms 11 and 12 of the same shown. A variable multi-speed reversible direction final application form of this invention is illustrated in FIGS. 7-11 with the inclusion of the adjustable camming and drive assembly (ACD) interlinking hereinbefore described elements 10, 11 and 12.

It will be obvious to those skilled in the art that various changes and modifications may be made therein without departing from the spirit of the invention, therefore I claim:

1. A variable drive transmission comprising a main input shaft, a principal element comprising a plurality of planetary gears within an output element engageable by a drive gear on said input shaft, an adjustable camming and drive assembly interconnected to said principal element by a transfer gear, said adjustable camming and drive assembly comprising a pair of oppositely disposed offset circular cams on a cam disk, pins extending from said circular cams registerable in slotted control disks on said main input shaft, a modified form of said principal element interconnected to said adjustable camming drive comprising at least one secondary drive input gear on said main input shaft, a plurality of planetary gears engageable on said secondary drive gear and engageable on a ring gear, a secondary output gear selectively driven by said planetary gears and a multiple transfer gear, a pair of cam engagement arms with one-way clutch drive gears selectively engaged thereon interconnecting said adjustable camming device and said modified form of said principal element, a central transfer gear engageable with a ring gear on said principal element for selectively disengaging said adjustable cam and drive assembly from said main drive shaft.

2. The variable drive transmission device of claim 1 wherein said control and transfer gear has a control element for varying relative output of adjustable camming and drive assembly to said camming engagement arms.

3. The variable drive transmission of claim 1 wherein said principal element and said secondary output gear and said ring gear assembly associated therewith have control elements thereon for selectively determining direction as well as relative output to said secondary output gear.

* * * * *